US009192092B2

(12) United States Patent
Tangorra et al.

(10) Patent No.: US 9,192,092 B2
(45) Date of Patent: Nov. 24, 2015

(54) RECIPROCATING METERING DEVICE

(75) Inventors: James Tangorra, Media, PA (US); Alexander Moseson, Havertown, PA (US); Marie LaPosta, Troy, NY (US); Raymond John Bauer, Lafayette Hill, PA (US); Kathryn VenVertloh, Boulder, CO (US); Kathleen Shacklett, Mt. Joy, PA (US); Phuong N. Diep-Lam, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 119 days.

(21) Appl. No.: 14/118,582

(22) PCT Filed: Jun. 7, 2012

(86) PCT No.: PCT/US2012/041353
§ 371 (c)(1),
(2), (4) Date: Nov. 19, 2013

(87) PCT Pub. No.: WO2012/173868
PCT Pub. Date: Dec. 20, 2012

(65) Prior Publication Data

US 2014/0144930 A1 May 29, 2014

Related U.S. Application Data

(60) Provisional application No. 61/496,582, filed on Jun. 14, 2011.

(51) Int. Cl.
*A01C 7/02* (2006.01)
*A01C 5/02* (2006.01)

(Continued)

(52) U.S. Cl.
CPC ... *A01C 7/02* (2013.01); *A01C 5/02* (2013.01); *A01C 7/002* (2013.01); *A01C 15/02* (2013.01)

(58) Field of Classification Search
CPC ........... A01C 5/02; A01C 7/002; A01C 15/02
USPC ..................................... 222/173, 425; 111/96
See application file for complete search history.

(56) References Cited

U.S. PATENT DOCUMENTS

| | | | | |
|---|---|---|---|---|
| 427,625 A * | 5/1890 | Segur | .............................. | 111/96 |
| 557,136 A | 3/1896 | Mengel et al. | | |

(Continued)

FOREIGN PATENT DOCUMENTS

| | | |
|---|---|---|
| DE | 345169 | 12/1921 |
| DE | 631757 | 6/1936 |

(Continued)

OTHER PUBLICATIONS

PCT International Search Report and Written Opinion for PCT/US2012/041353, mailed Sep. 21, 2012.

(Continued)

*Primary Examiner* — Daniel R Shearer
(74) *Attorney, Agent, or Firm* — Joseph E. Maenner; Maenner & Associates, LLC

(57) ABSTRACT

A reciprocating metering device is disclosed. The metering device provides a mechanism for discharging a metered amount of material, such as rice seeds, into a reservoir formed by plunging the metering device into soil. The metering device operates in a reciprocating motion wherein, in a first position, the spear extends from the device to form the reservoir and the seeds are retained within the device and in a second position, the spear is retracted into the device and the seeds are able to be discharged out of the device and into the reservoir.

12 Claims, 9 Drawing Sheets

(51) Int. Cl.
*A01C 7/00* (2006.01)
*A01C 15/02* (2006.01)

(56) References Cited

U.S. PATENT DOCUMENTS 1,287,516 A * 12/1918 Theobald ........................ 111/96
2,334,376 A 4/1941 Bauer
2,737,318 A * 3/1956 Molinare ...................... 222/191
3,771,474 A * 11/1973 Elston ............................. 111/96
3,982,661 A 9/1976 Feltrop
4,614,160 A * 9/1986 Curlett ............................ 111/96
5,363,984 A 11/1994 Laird, III
5,493,977 A * 2/1996 Maisch ........................... 111/92

FOREIGN PATENT DOCUMENTS

DE 10 2009 029812 12/2009
GB 922987 4/1963
GB 1483549 8/1977

OTHER PUBLICATIONS

International Preliminary Report on Patentability for PCT/US2012/041353, mailed Dec. 17, 2013.

* cited by examiner

RECIPROCATING METERING DEVICE

CROSS-REFERENCE TO RELATED APPLICATION

This application is a 371 of PCT application PCT/US2012/041353, filed on Jun. 7, 2012, which claims priority from U.S. Provisional Patent Application Ser. No. 61/496,582, filed on Jun. 14, 2011, both of which are incorporated herein by reference in their entireties.

FIELD OF THE INVENTION

The present invention relates to a reciprocating device that is used to deliver a metered amount of a product from the device. In an exemplary embodiment, the device delivers a metered amount of seeds during a planting process.

BACKGROUND OF THE INVENTION

Rural farmers in certain areas of the world still plant their seeds by hand, sometimes on steep rocky slopes, resulting in chronic pain due to the repeated bending required to form a hole in the soil and deposit the seeds. It would be beneficial to provide a tool that can form a hole in the soil and deposit a metered amount of seeds in a single motion.

BRIEF SUMMARY OF THE PRESENT INVENTION

Briefly, the present invention provides a reciprocating metering device comprising an elongated tubular handle having an outer perimeter and a receptacle therein for storing a material to be discharged. A slide pipe is disposed around the outer perimeter of the handle and arranged to slide along the handle between a first position and a second position. The slide pipe has a longitudinal slot formed therethrough. A biasing member extends outwardly of and longitudinally along the slide pipe. The biasing member has a first end fixedly coupled to the slide pipe and a second end fixedly coupled to the handle by a retainer extending through the longitudinal slot. The biasing member biases the slide pipe downward relative to the handle toward the first position. A chute extends outwardly of and longitudinally along the slide pipe. The chute is configured to receive the material from the receptacle and to discharge a metered portion of the material. A diverter is disposed within the handle. The diverter is configured to form a metering passage with the chute when the slide pipe is between the first position and the second position. A spear is disposed within the handle such that, when the slide pipe is in the first position, spear is enclosed within the device and the material is able to be discharged from a discharge end of the device and, when the slide pipe is in the second position, the spear is extended from the device and the material is retained within the device.

Further, the present invention provides a metering device comprising a handle having a top end, a bottom end, and an elongate tubular handle body extending between top end and the bottom end. The body has a discharge through-slot located at the bottom end, a chute entrance, and a chute exit located between the chute entrance and the discharge through-slot. A slider is slidingly disposed around the handle body between a first position and a second position, the slider having a discharge through-slot, a chute entrance, and a chute exit located between the chute entrance and the discharge through-slot, such that, when the slider is in the first position, the chute entrance of the handle is aligned with the chute entrance of the slider and the chute exit of the handle is aligned with the chute exit of the slider. A biasing member has a first portion coupled to the handle and a second and coupled to the slider such that the biasing member biasing the slider toward the first position. A member is fixedly disposed inside the handle body wherein, when the slider is in the first position, the member is located within the slider and, when the slider is in the second position, a portion of the member extends outwardly from the slider.

Additionally, the present invention provides a method of discharging a metered amount of a material comprising inserting a material into a reservoir formed in a handle in a metering device; allowing a portion of the material to discharge from the handle and into a top end of a chute via a diverter face; allowing a smaller portion of the material to discharge from the chute back into the handle below the diverter face; and reciprocating a slider along the handle from a first position wherein the smaller portion of the material is retained within the handle to a second position wherein the smaller portion of the material is discharged to a bottom opening in the metering device.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 3:
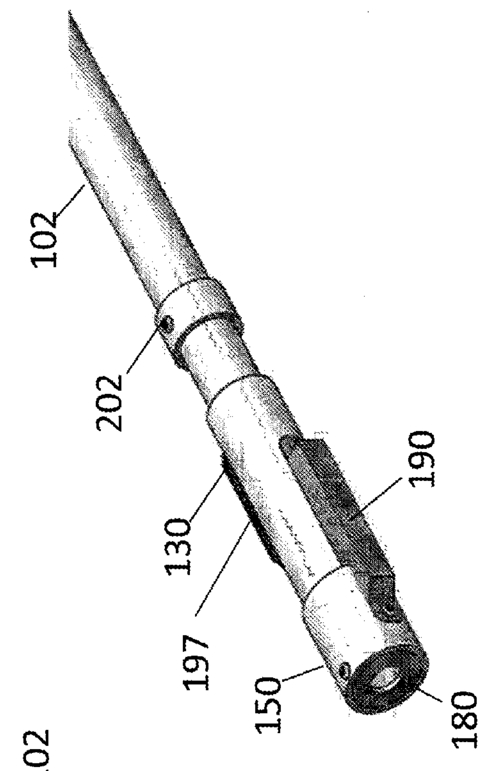
FIG. 3 is a right side perspective view of a bottom end of the metering device of FIG. 1.
Figure 2:
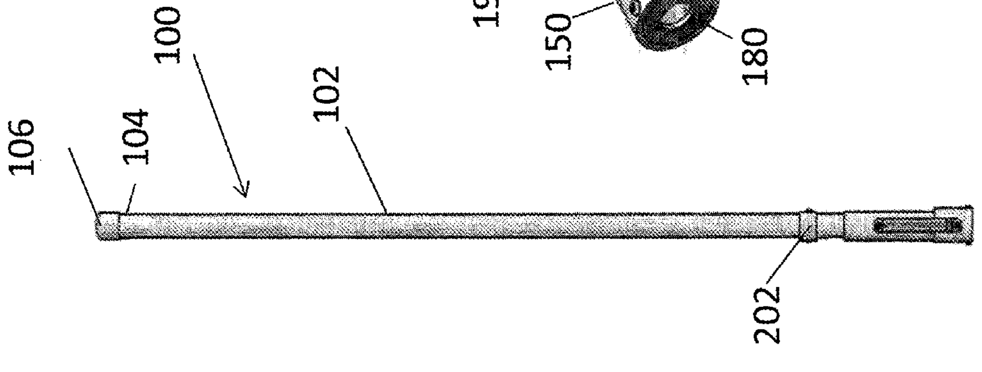
FIG. 2 is a right side elevation view of the metering device of FIG. 1.
Figure 1:
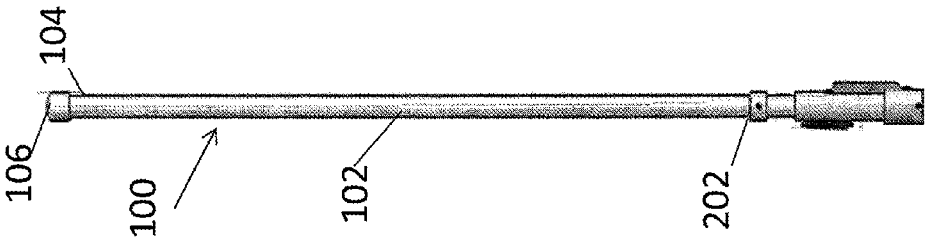
FIG. 1 is a front elevation view of a metering device according to an exemplary embodiment of the present invention.

In the drawings, like numerals indicate like elements throughout. Certain terminology is used herein for convenience only and is not to be taken as a limitation on the present invention. The terms upward and downward refer, respectively, to directions of movement of elements of the inventive device when a longitudinal axis of the inventive device extends generally vertically. The terminology includes the words specifically mentioned, derivatives thereof and words of similar import. The embodiments illustrated below are not intended to be exhaustive or to limit the invention to the precise form disclosed. The dimensions shown in the figures and provided in this specification are for illustrative purposes only and are not meant to be limiting. These embodiments are chosen and described to best explain the principle of the invention and its application and practical use and to enable others skilled in the art to best make and utilize the invention.

In an exemplary embodiment, the metering device according to the present invention is used to meter and to discharge a desired number of rice seeds during the planting process. Additionally, the metering device according to the present invention is used to form a reservoir in soil into which the seeds are planted. For example, approximately 10-12 rice seeds can be discharged from the inventive metering device with each reciprocal motion of the device. Those skilled in the art, however, will recognize that the metering device according to the present invention can also be used in any process during which a metered amount of a solid, generally granular substance is to be repetitively discharged. For example, the inventive metering device can be operatively coupled to a drive in a manufacturing environment so that a metered amount of material can be discharged with each reciprocation of the inventive device.

Referring now to the figures in general, a metering device 100 according to a first exemplary embodiment of the present invention is disclosed. Referring specifically to FIGS. 1-7, metering device 100 includes an elongated tubular handle 102 that carries all of the remaining elements of metering device 100. In an exemplary embodiment, handle 102 may be between approximately 1.3 and approximately 1.5 meters in length. Those skilled in the art, however, will recognize that the length of handle 102 may be other sizes as well. Handle 102 may be made from a lightweight material, such as polyvinyl chloride (PVC), bamboo, or other suitable material.

Handle 102 has an open top end 104 into which material to be discharged from metering device 100 is inserted prior to operating metering device 100. Material can be inserted through top end 104 or through an additional refilling connection (not shown) along the length of handle 102, either manually or automatically. Such a refilling connection may be temporary or permanent and can provide a quantity of material larger than the capacity of handle 102. In an exemplary embodiment, not shown, a material supply hopper may be connected by a flexible tubing to top end 104 in order to provide continuous feed of material to metering device 100. In order to prevent the discharge material from falling out of top end 104 in the event that metering device 100 is turned upside down and in order to prevent the discharge material from getting wet and possibly sticking to itself and clogging metering device 100 in the event that metering device 100 is used during a rainstorm, a cap 106 can be removably placed over top end 104.

Handle 102 also has an open bottom end 108 through which the material metering mechanism extends. A longitudinal axis 101 and an elongate tubular handle body 105 each extends the length of handle 102 between top end 104 and bottom end 108. A seed discharge through-slot 110 extends upward from bottom end 108 of handle 102 to allow discharge material discharged from metering device 100. In an exemplary embodiment, seed discharge through-slot 110 extends upward from bottom end 108 approximately 30 mm.

A chute entrance 112 is formed through handle 102 beginning approximately 84 mm from bottom end 108 and extending upward approximately 16 mm. A bottom face 114 of chute entrance 112 is beveled outwardly to facilitate discharge of the discharge material from handle 102.

A chute exit 116 is formed through handle 102 beginning approximately 56 mm from bottom end 108 and extending upward approximately 9.5 mm. Side faces 118, 120 of chute exit 116 are beveled inwardly to facilitate discharge of the discharge material back into handle 102. A screw hole 121 is formed in the wall of handle 102 diametrically opposite and just above chute exit 116.

Referring to FIGS. 3, 5, 6, 9, and 10, a slider, or slide pipe 130, is slidably disposed around the outer perimeter of handle 102 between a first position and a second position. In an exemplary embodiment, slide pipe 130 can be manufactured from PVC pipe. Slide pipe 130 is sized to allow upward and downward reciprocation of slide pipe along handle 102, parallel to longitudinal axis 101, with minimal friction resistance. In an exemplary embodiment, slide pipe 130 extends approximately 168 millimeters in length. Similar to handle 102, slide pipe 130 includes a seed discharge through-slot 132, a chute entrance 134, and a chute exit 136 with the same longitudinal respective dimensions as seed discharge through-slot 110, chute entrance 112, and chute exit 116 in handle 102. When slide pipe 130 is then the first position, chute entrance 134 is aligned with chute entrance 112 of handle 102 and chute exit 136 is aligned with chute exit 116 of handle 102.

A first screw hole 137 is formed above chute entrance 134, collinear with discharge through-slot 132, chute entrance 134, and chute exit 136. A longitudinal slot 138 is formed in slide pipe 130 diametrically opposite the discharge through-slot 132, chute entrance 134, and chute exit 136. A generally circular screw hole 139 is formed collinearly to longitudinal slot 138 proximate to the top of slide pipe 130.

A coupling 150 is fixedly coupled to and extends downwardly from bottom end 134 of slide pipe 130. In an exemplary embodiment, coupling 150 can be manufactured from PVC. An inner diameter of coupling 150 is sized to allow the outer perimeter of slide pipe 130 to be slid therein a snug fit. Adhesive can be applied to the inner diameter of coupling 150 to secure coupling 150 to a bottom end 139 of slide pipe 130. Coupling 150 has a top end 152 that extends slightly below the top of slide pipe discharge through-slot 132. Coupling 150 also has a coupling slot 154 and extends from top end 152 downward about 29 mm. Coupling 150 is attached to slide pipe 130 so that coupling slot 154 is aligned with discharge through-slot 132.

In an exemplary embodiment, all of handle seed discharge through-slot 110, handle chute entrance 112, handle chute exit 116, slide pipe seed discharge through-slot 132, slide pipe chute entrance 134, and slide pipe chute entrance 136 and coupling slot 154 are about 15 mm wide. The dimensions provided facilitate metered discharge of approximately 10 to 12 rice seeds with each operation of metering device 100. Those skilled in the art, however, will recognize that these dimensions can be altered to discharge different metered amounts of whatever material is to be discharged from metering device 100.

Referring to FIGS. 5 and 11-13, a generally cylindrical diverter 160 is fixedly inserted into handle 102 proximate to chute entrance 112 and chute exit 116. In an exemplary embodiment, diverter 160 can be manufactured from wood. Diverter 160 has a sloped upper face 162 that matches the angle of the bevel on bottom face 114 of chute entrance 112. Additionally, a first notch 163 is formed in diverter 160 at chute exit 116. First notch 163 is sized to allow the metered amount of discharge material to be located within first notch 163 and chute exit 116 during operation of metering device 100. First notch 163 includes a beveled ledge 164 that matches the angle of the bevel on the bottom face of chute exit 116.

Diverter 160 also includes a second notch 166 that is located at seed discharge through-slot 110. A generally cylindrical opening 168 is formed in a bottom surface 169 of diverter 160. Cylindrical opening 168 forms an annular receiver in diverter 160.

Diverter 160 is inserted into handle 102 so that sloped upper face 162 is aligned with bottom face 114 of chute entrance 112 such that diverter 162 is used to divert discharge material from a receptacle, or hopper 103, which is formed by the inner wall of handle 102 and upper face 162 of diverter 160. Diverter 160 also meters the desired amount of discharge material to be dispensed from device 100.

Figure 5:
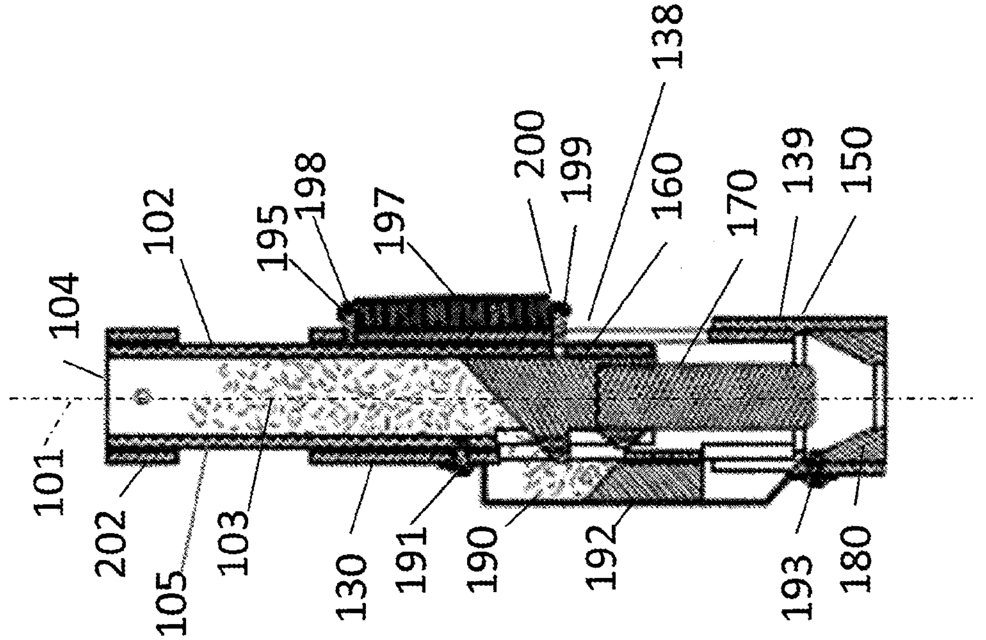
FIG. 5 is a sectional view of the bottom end of the metering device taken along lines 5-5 of FIG. 4.
Figure 4:
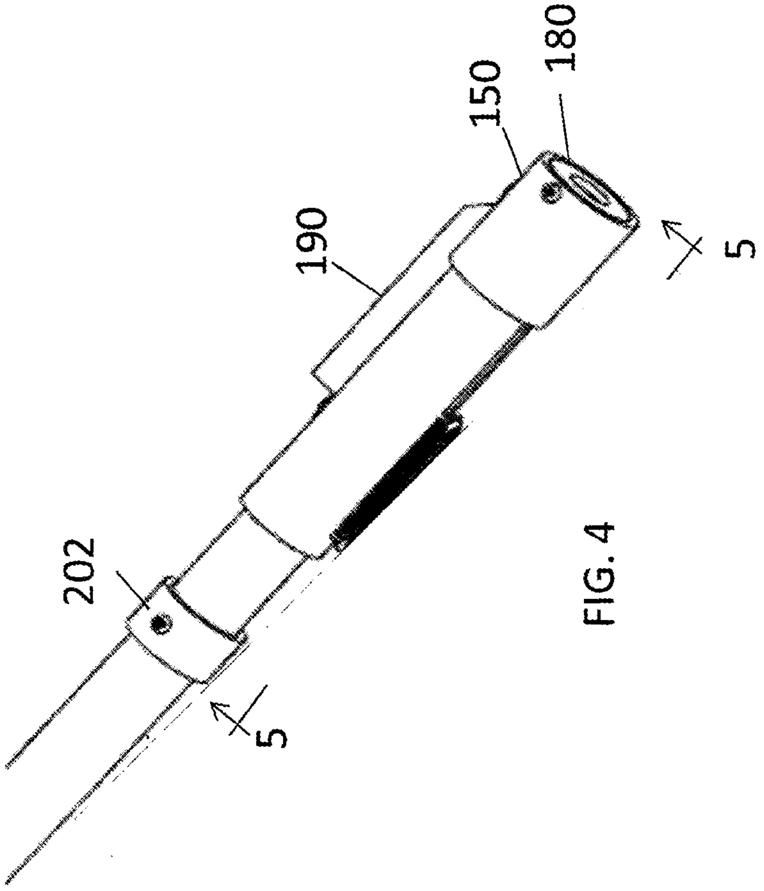
FIG. 4 is a left side perspective view of the bottom end of the metering device of FIG. 1.
Figure 14:
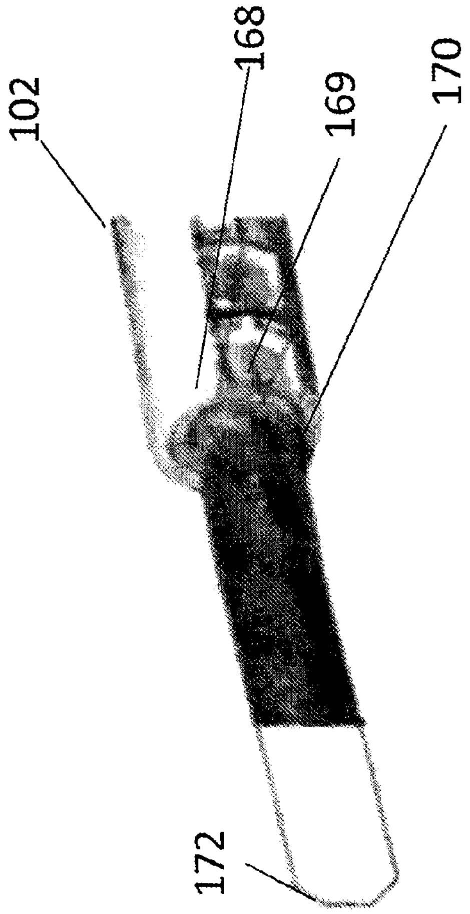
FIG. 14 is a perspective view of a spear inserted into the diverter of FIG. 11.

Referring to FIGS. 5 and 14, a generally cylindrical spear 170 is inserted into cylindrical opening the opening 168 such that a longitudinal portion of spear 170 extends along longitudinal axis 101. In an exemplary embodiment, spear 170 may be a metal rod. As shown FIG. 14, a bottom end 172 of spear 170 may be beveled to form a blunt point. The diameter of cylindrical opening 168 in diverter 160 and the diameter of cylindrical spear 170 are selected so that a tight fit is present between spear 170 and diverter 160. Optionally, a retaining device (not shown) such as a screw may be used to fixedly connect spear 170 to diverter 160. Spear 170 is used to form an opening in soil into which the discharge material is to be deposited during operation of metering device 100.

Figure 6:
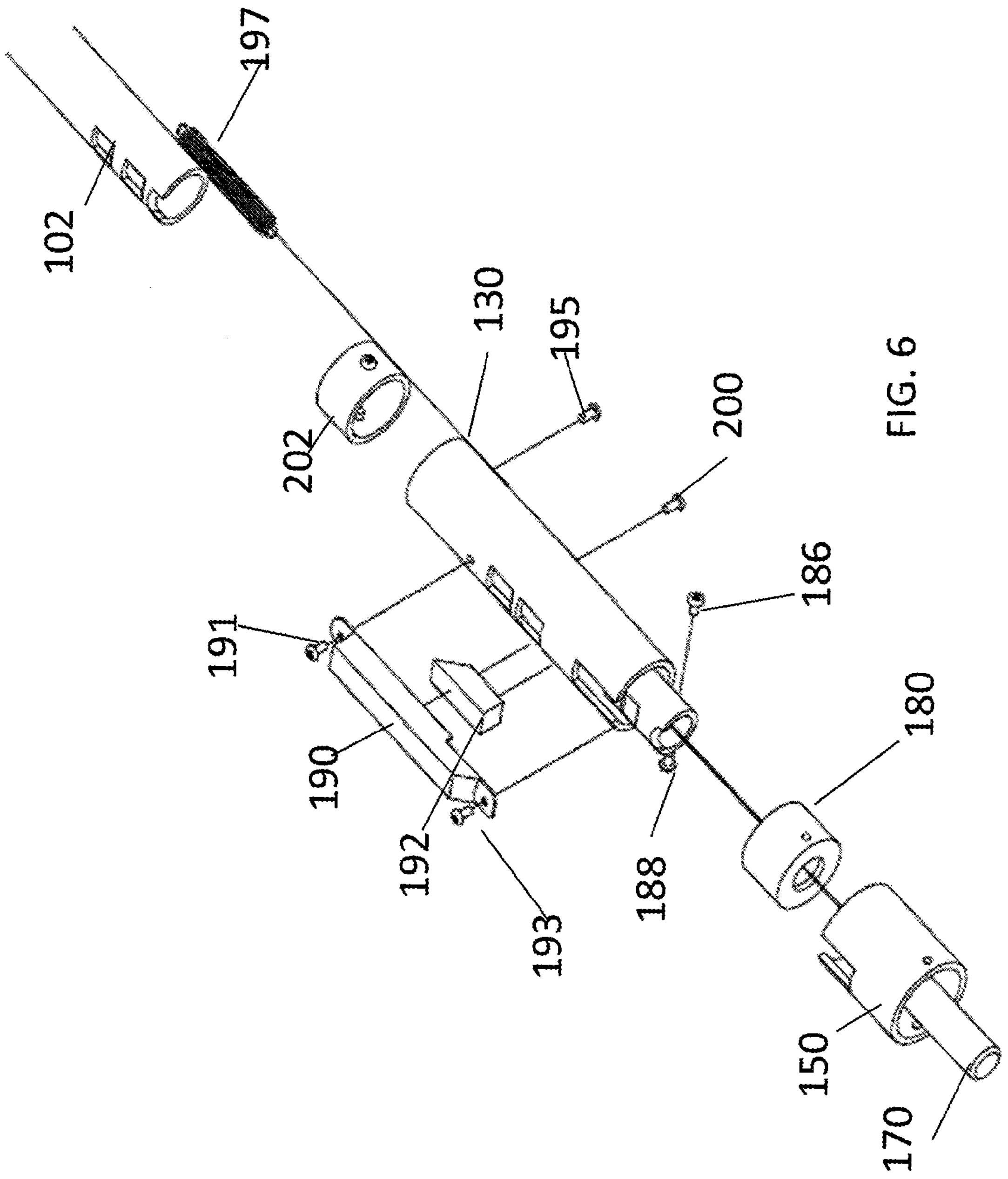
FIG. 6 is an exploded perspective view of the metering device of FIG. 1.
Figure 8:
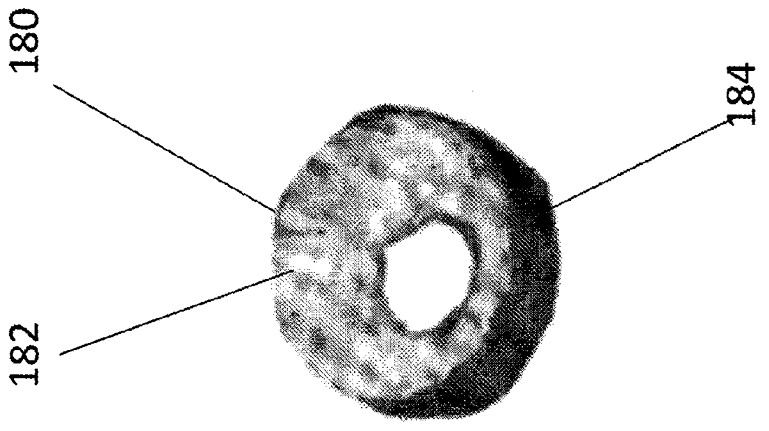
FIG. 8 is a perspective view of a funnel used in the metering device of FIG. 1.
Figure 7:
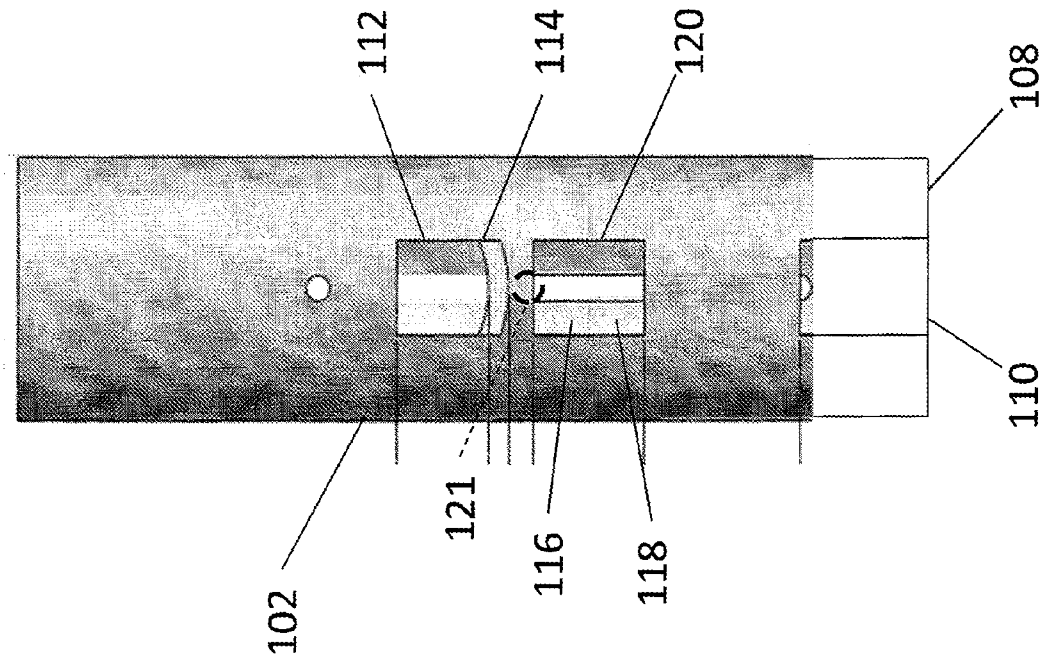
FIG. 7 is a right side elevation view of a bottom portion of a handle used in the metering device of FIG. 1.
Figure 10:
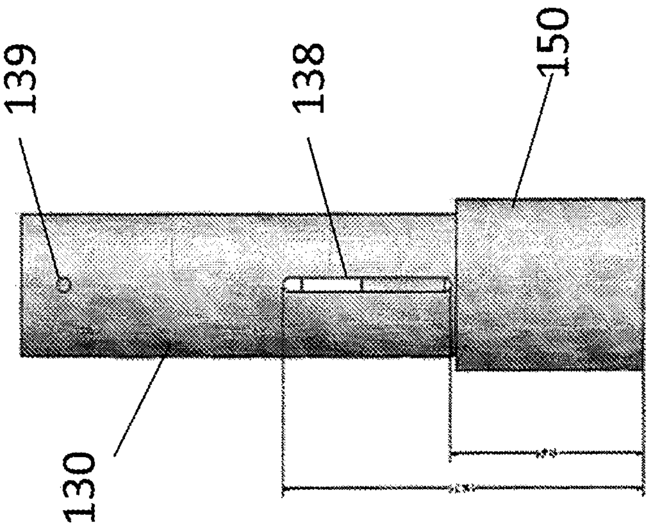
FIG. 10 is a left side elevation view of the slide pipe coupling of FIG. 9.
Figure 9:
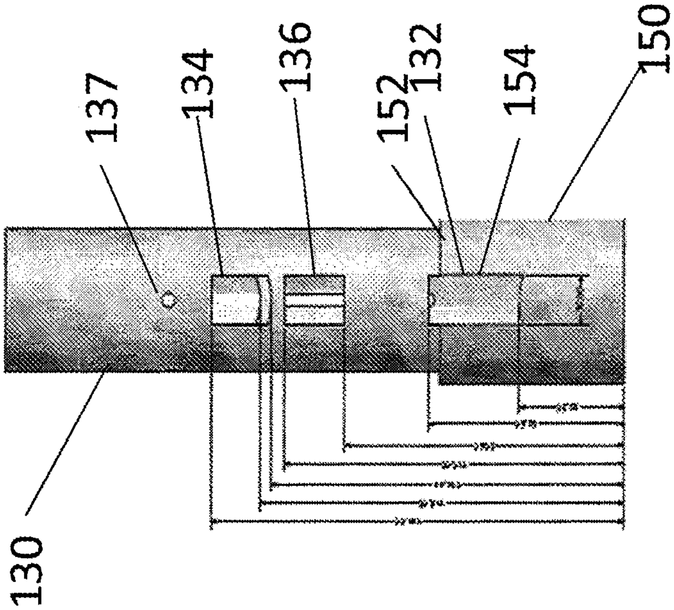
FIG. 9 is a right side elevation view of a slide pipe and coupling used in the metering device of FIG. 1.
Figure 12:
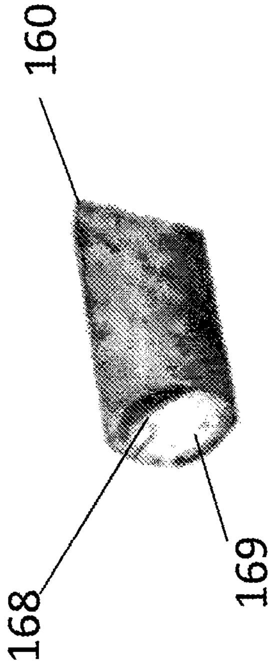
FIG. 12 is a bottom perspective view of the diverter of FIG. 11.
Figure 13:
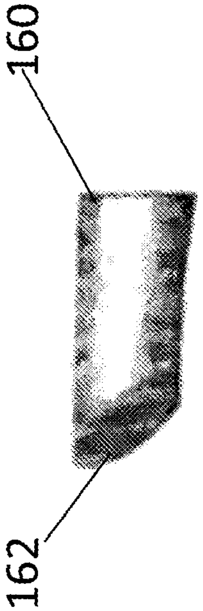
FIG. 13 is a top perspective view of the diverter of FIG. 11.
Figure 11:
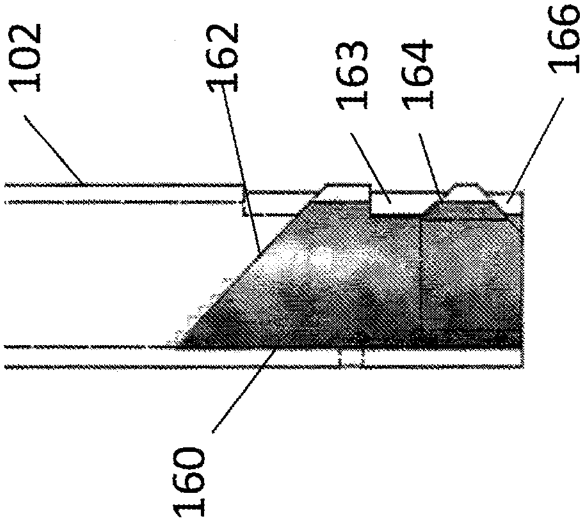
FIG. 11 is a front elevation view of a diverter used in the metering device of FIG. 1.
Figure 15:
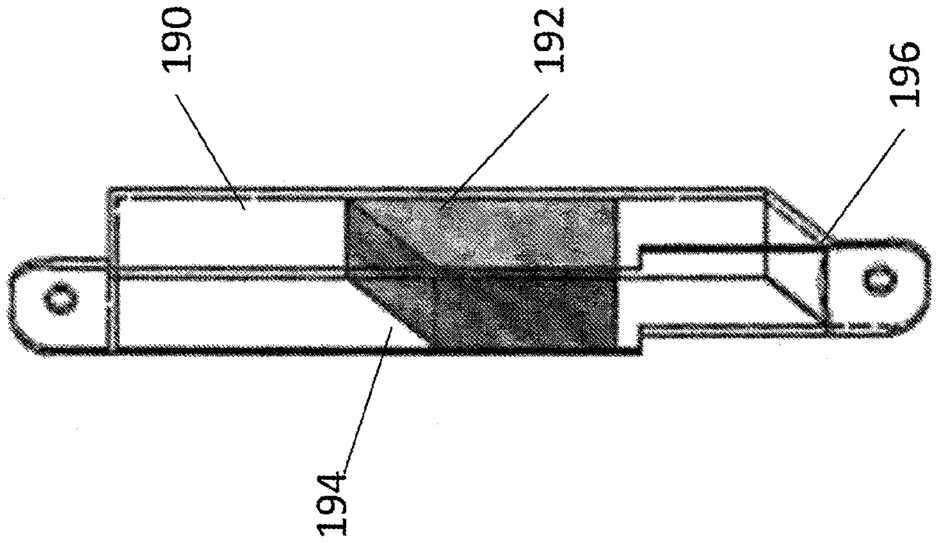
FIG. 15 is a perspective view of a chute and chute block used in the metering device of FIG. 1.

Refers to FIGS. 5, 6, 8, a generally annular funnel 180 is inserted into the bottom end of coupling 150. The inner wall 182 of funnel 180 is tapered inward toward the bottom of funnel 180, with a bottom opening 184 of funnel 180 being slightly larger than the outer diameter of spear 170 so that spear 170 can reciprocate through bottom opening 184. Funnel 180 directs discharge material into the opening formed by spear 170 after spear 170 retracts into metering device 100 during operation of metering device 100. Funnel 180 can be secured to slide pipe 130 via screws 186, 188 (shown FIG. 6).

While a spear is used in an exemplary embodiment of the present invention for use in planting seeds, those skilled in the art will recognize that the spear can be replaced by any other type of member that can be reciprocated through bottom opening 184 of funnel 180 and retain the material that is being metered inside funnel 180 when the member extends through opening 184 and discharge the material when the member is retracted through opening 184.

Referring to FIGS. 3-6 and 15, a chute 190 is fixedly coupled to and extends outwardly from slide pipe 130 and coupling 150. A top end of chute 190 is fixedly coupled to slide pipe 130 and a bottom end of chute 190 is fixedly coupled to coupling 150. Chute 190 is a generally elongate passage having an open side in fluid communication with discharge through-slot 132, chute entrance 134, and chute exit 136. A bottom end of chute 190 is cut back to accommodate the radially outward extension of coupling 150 from slide pipe 130.

Discharge material is able to pass from hopper 103, via diverter 160, through chute entrance 134 and into chute 190. A chute block 192 is inserted into chute 190. Chute block 192 includes a tapered top surface 194 that directs discharge material from chute 190 and into first notch 163 in diverter 160. Chute 190 includes an angled bottom surface 196 that directs discharge material into funnel 180. A first screw 191 extends through the top of chute 190 and secures the top of chute 190 to slide pipe 130 via first screw hole 137. A second screw 193 extends through the bottom of chute 190 and into coupling 150.

Referring to FIG. 5, a biasing member 197 includes a top end 198 fixedly coupled to slide pipe 130. A screw 195 passes through top end 198 of biasing member 197 and into screw hole 139. A bottom end 199 of the member 197 is fixedly coupled to handle 102 by a screw 200 that extends through longitudinal slot 138 and into screw hole 121 in handle 102. Biasing member 197 is selected so that biasing member 197 biases slide pipe 130 downward relative to handle 102. In an exemplary embodiment, biasing member 197 may be helical spring, although those skilled in the art will recognize biasing member 197 may be some other resilient material, such as for example, an elongate rubber strip or band.

Optionally, a stop collet 202 maybe fixedly coupled to handle 102 to define the travel of slide pipe 130 along handle 102. Stop collet 202 may be omitted if desired, in which case slide pipe 130 is able to extend as far as biasing member 197 can stretch.

To use metering device 100 to dispense rice seeds, a user (not shown) removes cap 106 from top end 104 of handle 102 and inserts a desired amount of seeds into hopper 103. As shown in FIG. 5, most of the seed remains in the hopper 103, while some of the seeds are directed by upper face 162 of diverter 160 into chute 190.

When a user (not shown) gets to a planting location, with metering device 100 extending generally vertically, the user thrusts the bottom of metering device 100 into the soil. Metering device 100 reciprocates upward/downward along longitudinal axis 101, forming a reservoir in the soil and depositing a metered amount of seeds into the reservoir.

Figure 16:
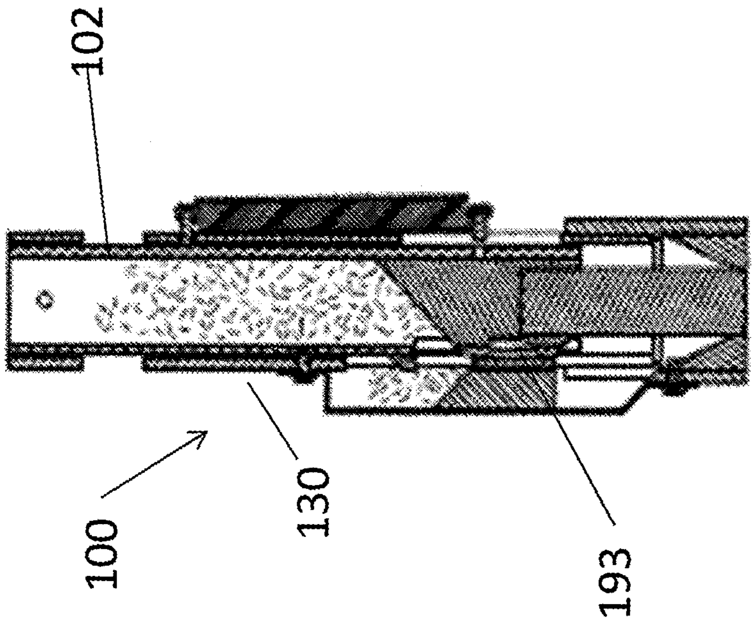
FIG. 16 is a sectional view of the bottom end of the metering device of FIG. 1 halfway through a delivery stroke.

Slide pipe 130 engages the soil but handle 102 still travels axially downward, thrusting spear 170 outward from slide pipe 130 and into the soil, forming the reservoir in the soil to accept the seeds. A sectional view of metering device 100 when metering device 100 is approximately halfway through its full range of motion is shown in FIG. 16. With metering device 100 in this position, the longitudinal motion of slide pipe 130 with respect to handle 102 allows a predetermined range of a number of seeds to be trapped within first notch 162 of diverter 160 by chute block 192, forming a wholly enclosed metering passage 193 between diverter and handle body 105, shown in FIG. 16. As discussed above, an exemplary predetermined range is between about 10 and about 12 rice seeds.

Figure 17:
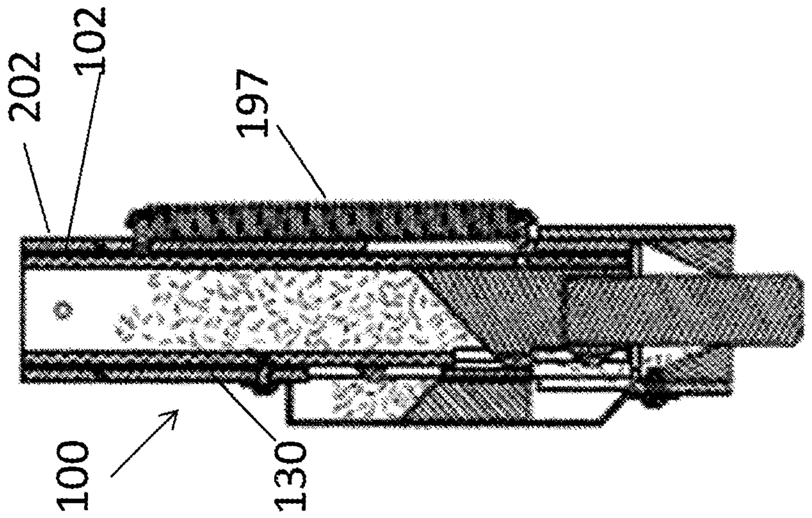
FIG. 17 is a sectional view of the bottom in the metering device of FIG. 1 at the end of the delivery stroke.

As spear 170 extends outward from funnel 180 to its fully extended position, as shown FIG. 17, slide pipe 130 slides further upward along handle 102 until slide pipe 130 engages stop collet 202. At this point, the seeds in metering passage 193 fall into the bottom end of chute 190 and into funnel 180, but are retained in funnel 180 by spear 170. In this position, biasing member 197 is fully biased away from its rest position and is extended generally parallel to longitudinal axis 101.

As the user lifts metering device 100 out of the soil, biasing member 197 biases slide pipe 130 downward to the position shown in FIG. 5. Spear 170 extends upward and out of funnel

180, so the seeds in funnel 180 can pass out of bottom opening 184 of funnel 180 and into the reservoir in the soil formed by spear 170. The user can move metering device to a new location repeat the process, depositing additional seeds into additional reservoirs.

Figure 18:
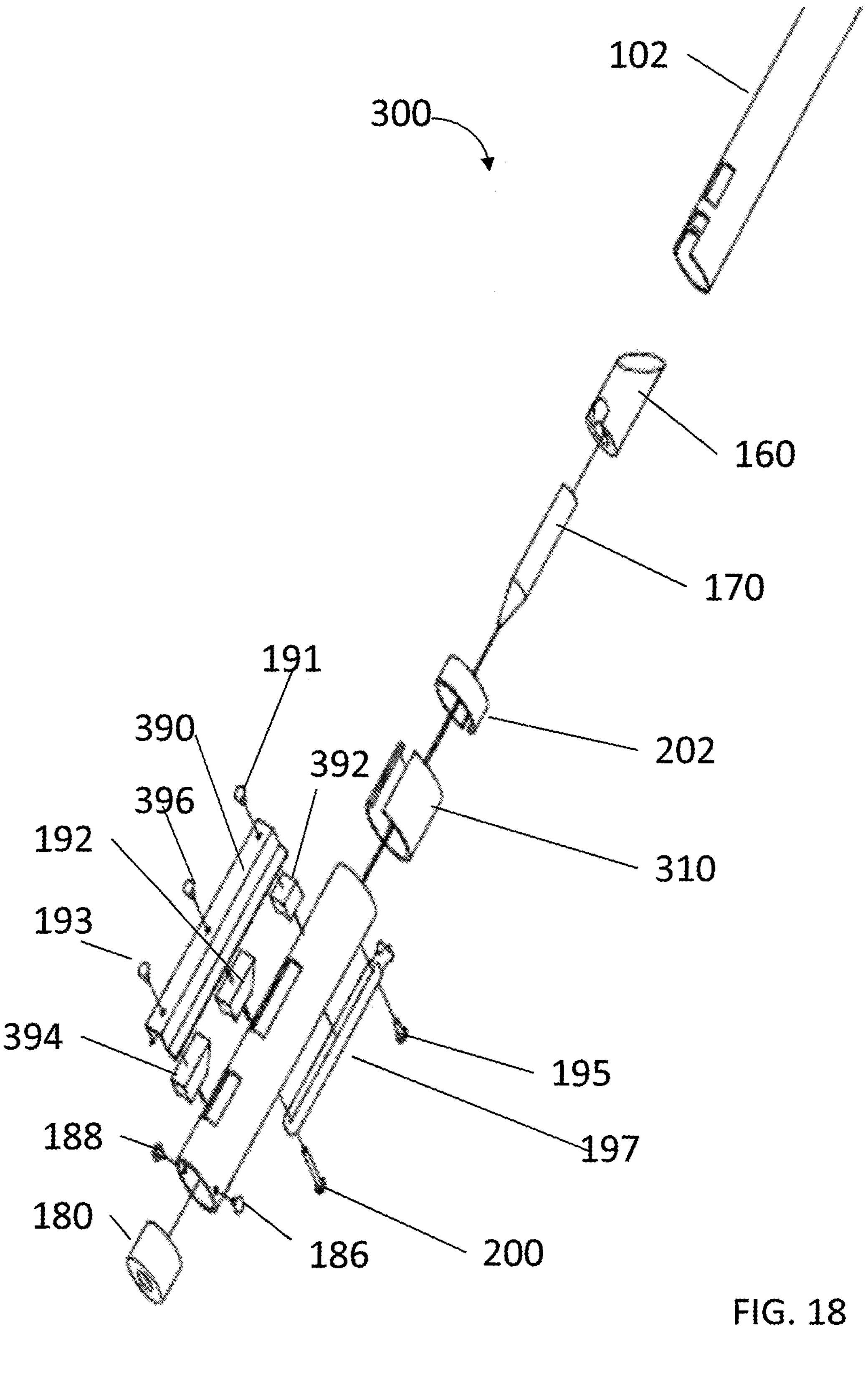
FIG. 18 is an exploded perspective view of an alternative embodiment of a metering device according to the present invention.

An alternative embodiment of a metering device 300 is illustrated in an exploded view in FIG. 18. Metering device 300 is similar to metering device 100 with the exception of chute 190, which has been replaced by chute 390 and the addition of an upper stop block 392, a lower stop block 394, and a third screw 396.

As shown FIG. 18, chute 390 is a generally straight channel that may be bent from a flat metal plate. Upper stop block 392 is inserted into the top end of the straight channel of chute 390 and lower stop block 394 is inserted into the bottom and up straight channel of chute 390. Third screw 396 is used to secure chute block 192 to chute 390.

Additionally, a reinforcement ring 310 has been added to the top exterior portion of slide pipe 130 in order to reinforce slide pipe 130. Reinforcement ring 310 extends around 330° around the circumference of slide pipe 130.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A reciprocating metering device comprising:

(a) an elongated tube having an outer perimeter and a receptacle therein for storing a material to be discharged;

(b) a slide pipe disposed around the outer perimeter of the tube, and arranged to slide along the tube between a first position and a second position, the slide pipe having a longitudinal slot formed therethrough;

(c) a biasing member extending outwardly of and longitudinally along the slide pipe, the biasing member having a first end fixedly coupled to the slide pipe and a second end fixedly coupled to the tube by a retainer extending through the longitudinal slot, the biasing member biasing the slide pipe downward relative to the tube toward the first position;

(d) a chute extending outwardly of and longitudinally along the slide pipe, wherein the chute is configured to receive the material from the receptacle and to discharge a metered portion of the material;

(e) a diverter disposed within the handle, the diverter being configured to form a metering passage with the chute when the slide pipe is between the first position and the second position; and (f) a member disposed within the tube such that, when the slide pipe is in the first position, the member is enclosed within the device and the material is able to be discharged from a discharge end of the device and, when the slide pipe is in the second position, the member is extended from the device and the material is retained within the device.

2. The reciprocating metering device according to claim 1, wherein the chute comprises an upper chamber in fluid communication with a receptacle and a lower chamber in fluid communication with the discharge end of the device.

3. The reciprocating metering device according to claim 1, wherein the diverter comprises a sloped upper face.

4. The reciprocating metering device according to claim 3, wherein the handle comprises a chute entrance, wherein the chute entrance has a beveled bottom face matching the angle of the sloped upper face of the diverter.

5. The reciprocating metering device according to claim 1, wherein the spear is coupled to the diverter.

6. The reciprocating metering device according to claim 1, wherein, when the slide pipe is between the first position and a second position, a metered volume is formed between the diverter and the chute.

7. A metering device comprising:

(a) a handle having a top end, a bottom end, and an elongate tubular handle body extending between top end and the bottom end, the body having a discharge through-slot located at the bottom end, a chute entrance, and a chute exit located between the chute entrance and the discharge through-slot;

(b) a slider slidingly disposed around the handle body between a first position and a second position, the slider having a discharge through-slot, a chute entrance, and a chute exit located between the chute entrance and the discharge through-slot, such that, when the slider is in the first position, the chute entrance of the handle is aligned with the chute entrance of the slider and the chute exit of the handle is aligned with the chute exit of the slider;

(c) a biasing member having a first portion coupled to the handle and a second and coupled to the slider, the biasing member biasing the slider toward the first position; and (d) a member fixedly disposed inside the handle body wherein, when the slider is in the first position, the member is located within the slider and, when the slider is in the second position, a portion of the member extends outwardly from the slider.

8. The metering device according to claim 7, further comprising a chute coupled to and extending outwardly of the slider, wherein the chute is configured to allow passage of a material from the chute entrance of the slider to the chute exit of the slider.

9. The metering device according claim 8, further comprising a diverter disposed inside the handle body, wherein the diverter is arranged to direct a material from the handle body and into the chute.

10. The metering device according claim 9, wherein the diverter includes a notch portion formed therein such that, when the slider is between the first position and second position, a wholly enclosed metering passage is formed between the diverter and the handle body.

11. The metering device according to claim 9, wherein the member is coupled to the diverter.

12. The metering device according claim 8, wherein the chute comprises a chute block arranged to direct material from the chute and into the handle body.

* * * * *